United States Patent
Axt et al.

(10) Patent No.: US 12,498,694 B2
(45) Date of Patent: Dec. 16, 2025

(54) OPERATING DEVICE AND METHOD

(71) Applicant: HOMAG GmbH, Schopfloch (DE)

(72) Inventors: Jochen Axt, Horb (DE); Andreas Hahn, Schiltach (DE); Timo Zimmermann, Horb/Dettingen (DE)

(73) Assignee: HOMAG GmbH, Schopfloch (DE)

( * ) Notice: Subject to any disclaimer, the term of this patent is extended or adjusted under 35 U.S.C. 154(b) by 518 days.

(21) Appl. No.: 17/429,296

(22) PCT Filed: Feb. 7, 2020

(86) PCT No.: PCT/EP2020/053127
§ 371 (c)(1),
(2) Date: Aug. 6, 2021

(87) PCT Pub. No.: WO2020/161300
PCT Pub. Date: Aug. 13, 2020

(65) Prior Publication Data
US 2022/0147014 A1 May 12, 2022

(30) Foreign Application Priority Data

Feb. 8, 2019 (DE) .................. 10 2019 103 152.4

(51) Int. Cl.
*G05B 19/401* (2006.01)
*G05B 19/4063* (2006.01)
(Continued)

(52) U.S. Cl.
CPC ....... *G05B 19/4063* (2013.01); *G05B 19/401* (2013.01); *G05B 19/4083* (2013.01); *G05B 19/40938* (2013.01)

(58) Field of Classification Search
CPC .............. G05B 19/4063; G05B 19/401; G05B 19/4083; G05B 19/40938;
(Continued)

(56) References Cited

U.S. PATENT DOCUMENTS

2010/0082146 A1 4/2010 Sato
2010/0085357 A1* 4/2010 Sullivan .................. G06T 15/06
345/420
(Continued)

FOREIGN PATENT DOCUMENTS

CN 108778683 A 11/2018
DE 102007045595 A1 3/2009
(Continued)

OTHER PUBLICATIONS

"Hoedtke—Hybride additive Fertigung transformiert die Produktion von hochwertigen Metallteilen", Siemens PLM Software Veroffentlichungen, Jan. 1, 2018 (Jan. 1, 2018), Seiten 1-4, XP093052495, https://www.janus-engineering.com/fileadmin/user_upload/images/news/news_feed/Downloads/Siemens-PLM-Hoedtke-DE.pdf, 8 pages including translation.
(Continued)

*Primary Examiner* — Thomas C Lee
*Assistant Examiner* — Tyler Dean Hedrick
(74) *Attorney, Agent, or Firm* — Morgan, Lewis & Bockius LLP

(57) ABSTRACT

Operating device for a machining device configured to machine workpieces consisting preferably at least in sections of wood, said operating device comprising: a display device, and a selection device, wherein the operating device is configured such that on the selection device, a user can select machining operations on a workpiece and that, based on the selected machining operations, a 3D model corresponding to the machined workpiece is shown in the display device.

11 Claims, 2 Drawing Sheets

(51) Int. Cl.
*G05B 19/408* (2006.01)
*G05B 19/4093* (2006.01)

(58) Field of Classification Search
CPC .......... G05B 2219/35148; G05B 2219/35318; G05B 2219/45229; G05B 19/4069; Y02P 90/02
See application file for complete search history.

(56) References Cited

U.S. PATENT DOCUMENTS

| | | | |
|---|---|---|---|
| 2012/0057952 A1* | 3/2012 | Tognin | B42C 9/02 412/28 |
| 2013/0262065 A1 | 10/2013 | Erdim et al. | |
| 2014/0074279 A1* | 3/2014 | West | G05B 19/409 700/159 |
| 2014/0181752 A1* | 6/2014 | Kim | G06F 3/04817 715/835 |
| 2017/0115656 A1* | 4/2017 | Ottnad | B23K 26/1464 |
| 2017/0203441 A1* | 7/2017 | Nelson | B25J 9/162 |
| 2020/0151929 A1* | 5/2020 | Yoshida | G06T 11/60 |
| 2022/0179551 A1* | 6/2022 | Tanaka | B29C 45/76 |

FOREIGN PATENT DOCUMENTS

| | | |
|---|---|---|
| DE | 102012006124 A1 | 9/2013 |
| EP | 1762919 A2 | 3/2007 |
| EP | 2148258 A1 | 1/2010 |
| EP | 2254013 A1 | 11/2010 |

OTHER PUBLICATIONS

"Prospektblatt Firma Homag vom Mai 1992: Optimat Bearbeitungszentrum BZO 1 O", Announcement Homag Maschinenbau, Mai 1992, Seiten 1-3, XP002968647, 6 pages including translation.

* cited by examiner

OPERATING DEVICE AND METHOD

TECHNICAL FIELD

The present invention relates to an operating device for a machine tool and a method of operating a machine tool. The present invention further relates to a machining system and a machining method.

PRIOR ART

It is known to control machine tools for machining workpieces preferably consisting at least in sections of wood by means of an operating device.

Operating devices of this type can comprise display devices as well as selection devices to thus select machining operations from predefined lists or to define machining operations individually by means of parameters. Common machining operations include, for example, milling operations or gluing operations, depending on the intended machine tool.

The operation of such a display device requires an experienced user, trained for the machine tool, who is able to link how an unmachined workpiece becomes a desired machined workpiece by means of certain machining steps. Due to the complexity of the machining operation, even an experienced user trained for the machine tool cannot always perform such linking. Thus, the result of the machined workpiece can often only be seen after it is produced. Defects become only apparent at this point; in such cases the workpiece is defective and must be disposed of. Subsequently, probable incorrect parameters, which can also only be recognized by experienced users, are changed and another workpiece is produced. This iterative process is expensive and time-consuming.

Another risk due to operating errors is the emergence of crash situations. Incorrectly set machining operations can thus potentially result in a risk for machine and/or user.

DESCRIPTION OF THE INVENTION

Thus, the object of the present invention is to provide an operating device for a machine tool, and a method of operating a machine tool, which reduces the production of rejects and allows a faster, more cost-effective and safer start-up production at the same time.

According to the invention, this object is solved by an operating device for a machine tool having the features of patent claim 1 and by a method of operating a machine tool having the features of patent claim 8. Advantageous embodiments and improvements of the invention can be found in the subclaims.

The invention was based in particular on the finding that the production of rejects, the expensive and time-consuming start-up production, and the potentially arising crash situations are due in particular to the high abstraction requirements placed on a user when selecting machining operations. Furthermore, it was recognized that the high abstraction requirements lie in particular in the fact that a link must be made between a machining operation, which is usually only set by parameters, and a desired physical result.

Using this knowledge, the invention provides an operating device and a method in which a model of a machined workpiece is displayed to a user in response to previously selected machining operations. The user can thus virtually understand the effects of planned machining operations.

The invention thus ensures greater safety in the handling and operation of machine tools. It is thereby made possible to detect errors in advance. Rejects and crash situations can be avoided.

If need be, the operator can be shown directly which set machining operations have which machining result. The time required to generate a correct compilation of machining operations is significantly reduced as well. Moreover, user friendliness is increased due to the display of the machined workpiece.

An operating device according to the invention for a machine tool configured to machine workpieces consisting preferably at least in sections of wood comprises: a display device and a selection device. The operating device is configured such that on the selection device, the user can select machining operations on a workpiece for the machine tool, and that a model corresponding to the machined workpiece is shown in the display device on the basis of the selected machining operations.

According to a further development of the invention, the operating device is configured such that the model is shown in the display device immediately after selecting a machining operation, in particular without further input to the operating device. The user thus receives immediate feedback on the result after each individual input step, which further reduces the risk of rejects and allows a quick operation.

In the operating device, the display device is preferably a screen, and/or the selection device is preferably one or more buttons or a computer mouse, wherein the display device and selection device can together form a touchscreen.

Different input types have proven to be advantageous for different input formats. For example, a numeric keypad is advantageous for entering numerical values, whereas a touch surface on a touchscreen can be more efficient for rotating virtually displayed models. The different input types can also be useful in combination.

Machining operations to be selected are preferably additive and/or removing machining operations, wherein removing machining operations are, in turn, preferably milling operations and/or cutting operations, and additive machining operations are preferably coating operations and/or gluing operations.

In wood working, these machining operations have proven to be cost effective while producing high quality results at the same time. However, machining operations are not limited to this; rather any machining operation that can be displayed by a machine tool can be selected by the operating device.

The machined workpiece to be shown by the display device is thereby preferably shown using data of the original workpiece as well as possibly of logical operations.

In computer technology, it has proven to be successful to represent models of physical structures as well as changes thereof by means of logical operations. For example, the coating of a workpiece with a surface layer can be achieved by adding the spatial data of the workpiece with the spatial data of the surface layer. Together, these data generated by conjunction therefore form the machined workpiece with surface layer. The same applies to a removing machining operations and combinations of several machining operations, where several logical operations are linked one after the other according to the machining operations.

The present invention further discloses a machining system comprising an operating device according to the invention and a machine tool configured to machine workpieces consisting preferably at least in sections of wood.

The corresponding advantages as described above apply to the machining system. However, it is particularly advantageous for the machining system to comprise a conveying device configured to convey workpieces through the machine tool, namely preferably in pass-through operation. Alternatively, however, it can also be a so-called stationary machine, in which the workpieces are arranged to be stationary during machining. This usually allows more complex workpiece geometries to be machined. Hybrid forms of both concepts are possible within the scope of the invention.

Further disclosed is also a method of operating a machine tool configured to machine workpieces consisting preferably at least in sections of wood. The method thereby comprises the following steps: selecting machining operations on a machine tool, and displaying a model of a machined workpiece, wherein the display of the model of the machined workpiece is generated based on the previously selected machining operations.

The method is preferably carried out using a machining system according to the invention.

The intended machining operations can be physically realized by subsequently carrying out the machining operations.

Preferably, the method additionally comprises the following step: manually selecting, automatically selecting, or parametrically generating, a model of an unmachined workpiece prior to selecting machining operations thereon.

Depending on the complexity of the machine tool, workpieces to be machined can be automatically detected, or manually entered or parametrically generated. On this basis, a model of the unmachined workpiece can then be generated which is used for the further virtual machining operations.

Preferably, the model of the machined workpiece has been created using a CAD model and/or a virtual volume model of an unmachined workpiece.

As shown above, it has proven to be successful in computer technology to display models of physical structures as well as changes thereof by means of logical operations. For example, the coating of a workpiece with a surface layer can be achieved by adding the spatial data of the workpiece with the spatial data of the surface layer. Together, these form the machined workpiece with a surface layer. The same applies to removing machining operations and combinations of several machining operations, where several logical operations are linked one after the other according to the machining operations.

The present invention further discloses a machining method comprising the following steps: a method as previously shown, subsequent machining of the workpiece.

It can be further preferred to operate above-mentioned methods by means of above-mentioned devices; in particular all of the advantageous embodiments of devices and methods are compatible with each other.

BRIEF DESCRIPTION OF THE DRAWINGS

The invention is described hereinafter by way of embodiment examples with reference to the enclosed figures of the drawings.

The Figures Show.

DETAILED DESCRIPTION OF THE PREFERRED EMBODIMENTS

Figure 1:
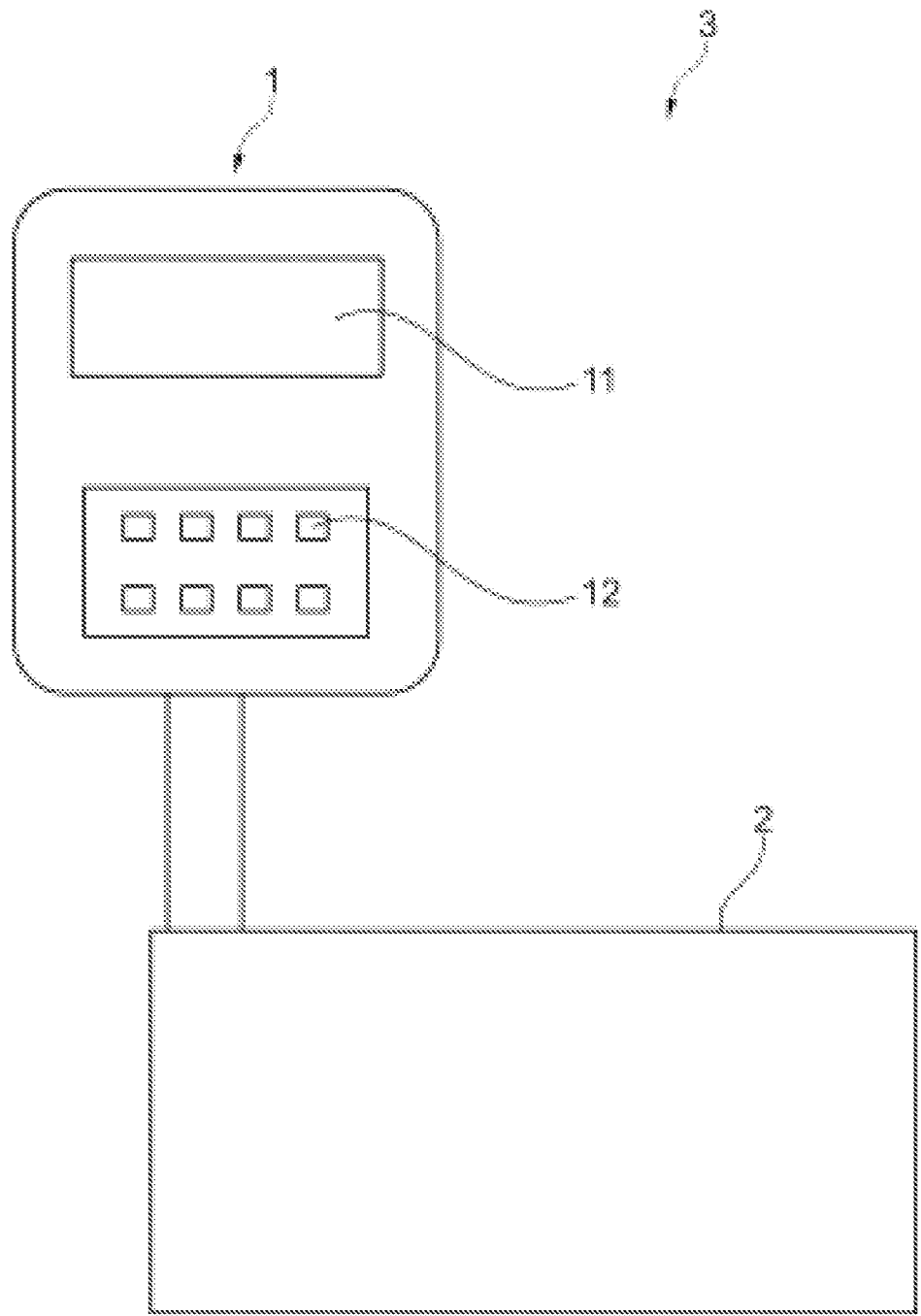
FIG. 1 shows a representation of an operating device on a machine tool of one embodiment of the present invention.

FIG. 1 shows a representation of an operating device on a machine tool of one embodiment of the present invention.

In particular, FIG. 1 shows an operating device 1 that is part of a machining system 3. The operating device 1 comprises in particular a display device 11 and a selection device 12. The display device 11 is configured as a screen that allows optical (preferably colored) signal transmission of dynamic information such as images or signs to a user. Common types of screens are, for example, liquid crystal displays (LCD). The screen is in particular capable of displaying information that allows the operation of the machining system 3.

The operating device 1 further comprises a selection device 12 allowing the selection of commands for the machining system and thus the selection of machining steps.

In the present, preferred embodiment, the selection device 12 is configured in two-parts. One part of the embodiment is a touch-sensitive layer of the display device 11, by which the display device 11 and part of the selection device 12 together form a touch screen. Screen touches can thus directly trigger visual feedback on the screen.

A second part of the selection device 12 is a keyboard located below the display device 11. With this keyboard, it is in particular possible to make entries which consist of numerical values or text commands. Alternatively, a computer mouse could further be provided as (part of) selection device 12, which has not been realized in the present embodiment.

Of course, other selection devices can also be considered within the scope of the invention such as microphones or voice input systems.

Further provided in the selection device 12 or elsewhere in the machining system 3 is a calculation unit (not shown). The calculation unit allows inputs to the selection device 12 to be detected and representations to be computed which are then output to the display device 13.

The calculation unit is furthermore also capable, on the basis of workpieces and selected machining operations, of generating a model of a machined workpiece which can then be shown by the display device 13.

The calculation unit thus corresponds to an electronic data processing system and can, for example, be configured as a computer in a variety of forms.

The machining system 3 further comprises a machine tool 2 on which the physical machining of the workpiece can be performed. Possible machine tools include milling machines, saws, coating devices, edging devices or similar. In particular, the machine tool 2 is also to be configured as a combination of different individual machine tools that are capable of machining the workpieces one after the other. The machine tool can thereby be configured as a pass-through machine or as individual manufacture.

Figure 2:
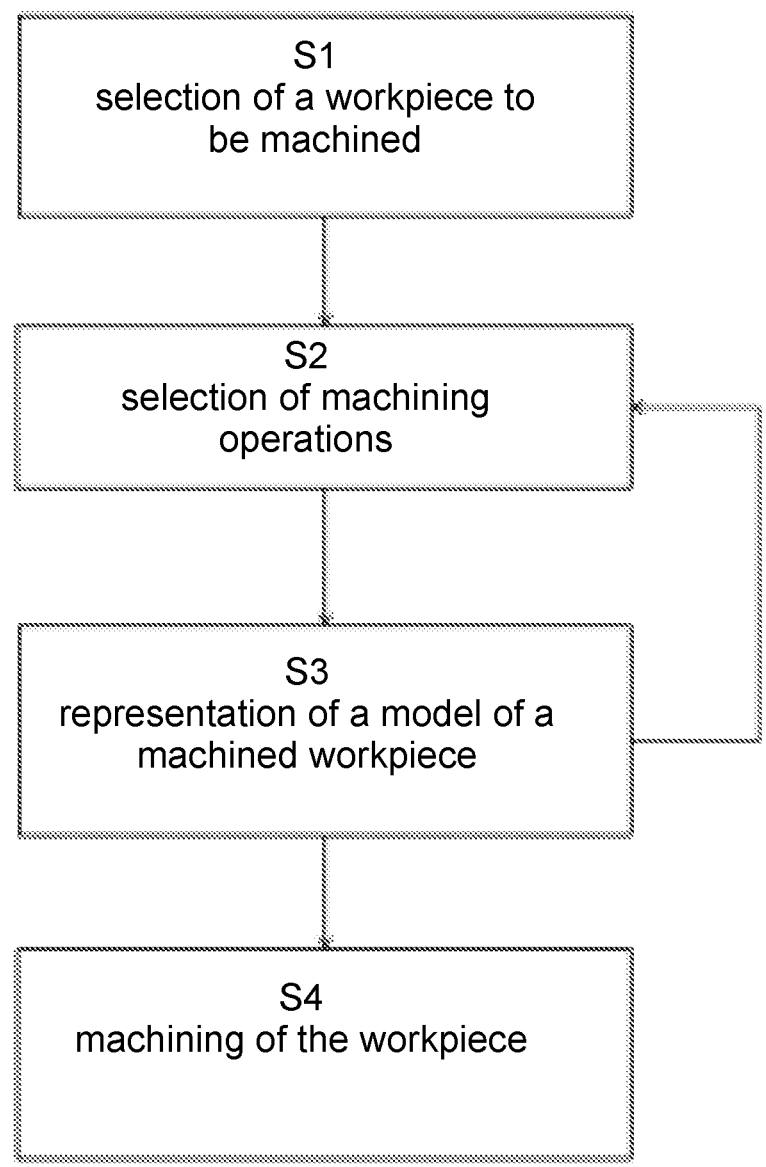
FIG. 2 shows a representation of a flowchart of a method performed on an operating device of one embodiment of the present invention.

FIG. 2 shows a representation of a flowchart of a method performed on an operating device of one embodiment of the present invention.

Step S1 is the selection of a workpiece to be machined. This can be done automatically, for example by scanning a barcode on the workpiece to be machined, by detecting an RFID tag on the workpiece, or by automatically measuring the dimensions of the workpiece, for example using laser measurements.

Alternatively, the workpiece to be machined can also be selected manually or parametrically, for example by entering characteristic data or parameters on the operating device.

It is further possible that in step S1, an unmachined workpiece is shown by the display device 11. The display of the unmachined workpiece can be generated by data retrieved during automatic recognition of the workpiece, or using the manually entered data. In particular, volume models corresponding to CAD data are thus generated.

Subsequently, in step S2, one or more machining operations are selected that are to be performed on the unmachined workpiece. The selection can be made by means of predefined templates which are, for example, stored as favorites, or by programming parameters of machining operations.

Step S3 then shows a virtual machining result on the display device, immediately indicating the corresponding (intermediate) result for each individual selection. This model, which corresponds to the machined workpiece, is generated in the calculation unit. In this embodiment, based on the workpiece to be machined, a CAD volume model is generated, or the model generated or retrieved in step S1 is retrieved again.

The calculation of the CAD volume model is in particular based on logical links established between the volume model of the unmachined workpiece and a volume model of the machining operation.

If the machining operation is, for example, a milling operation using a milling head, i.e. a removing machining operation, an additional volume model of the predefined path is created based on the geometry of the milling head, i.e. a volume based on the swept path of the milling head.

The volume model of the milling head is then subtracted from the volume model of the unmachined workpiece by means of the logical operation. This means that the volume model of the machined workpiece follows as a result.

If the machining operation is, for example, a gluing operation of an edge band to a workpiece narrow surface of a substantially plate-shaped workpiece, i.e. an additive machining operation, an additional volume model of the given edge band including a glue layer is generated.

If several machining operations are selected, subsequent machining operations make use of a partially machined volume model from a previous virtual machining step, instead of the volume model of the original unmachined workpiece.

After a fully machined volume model has been calculated, it is shown on a display device 11 in step S3. The 3D model is immediately recalculated with each parameter change, and thus a direct visualization of the result is made.

At this point, a user has the opportunity to ascertain whether the calculated machined volume model corresponds to the user's ideas or whether changes thereto are necessary. In this regard, it is preferred that the calculated machined volume model is shown on the display device 11 in a rotatable and an enlargeable manner. The view can be manipulated by means of the selection device 12, in particular by touching the touchscreen. In particular, multi-touch gestures such as "pinch-to-zoom" can be provided, whereby an enlargement is achieved by swiping two fingers apart. This increases the usability. Alternatively or additionally, the view can also adapt automatically or according to predetermined criteria to the respective situation. For example, the system can zoom in on the corresponding position for geometrically small changes, while showing an overall view for large-scale changes.

Moreover, the display can also visualize which entered machining operations are present at which position on the workpiece, for example by means of suitable indicators.

If the user notices any requests for changes based on the calculated machined volume model, it is still possible to go back to step S2 in order to select other machining operations or to adjust parameters of selected machining operations.

Requests for changes can, on the one hand, arise from non-optimal results of the volume model of the machined workpiece and, on the other hand, are also due to potentially identified risks such as crash situations. For example, it can be detected that a milling operation is running along or through a workpiece holder, and the machining operations can then be modified. This can be done until the user cannot identify any potential risks.

These iterative processes of adapting the machining steps to the desired result can be interpreted as similar to the iterative process of repeated manufacturing of workpiece samples presented in the introduction. However, the purely virtual nature of the adjustment of the machining steps allows advantages to be realized. For example, the time required to generate a correct compilation of machining operations is significantly reduced. Furthermore, the display of the machined workpiece increases user friendliness, and crash situations can be avoided.

After suitable selection of the machining steps, the machining of the workpiece in the machine tool can be started in step S4.

LIST OF REFERENCE NUMBERS

1 operating device
11 display device
12 selection device
2 machine tool
3 machining system

The invention claimed is:

1. A machining system comprising:
   a machine tool configured to machine workpieces consisting at least in sections of wood; and
   an operating device for the machine tool, the operating device comprising:
      a display device, and
      a selection device,
   wherein the operating device is configured such that on the selection device, the user can select machining operations for the machine tool to machine a workpiece, and wherein the display device is configured such that on the basis of the selected machining operations, a model corresponding to a machined workpiece is shown in the display device,
   wherein the machining operations to be selected are additive and removing machining operations,
   wherein the removing machining operations are milling operations and/or separating operations, and
   wherein the additive machining operations are gluing operations of an edge band to a workpiece narrow surface of a substantially plate-shaped workpiece.

2. The machining system according to claim 1, wherein the operating device is configured such that the model is immediately shown in the display device after selecting a machining operation without further input to the operating device.

3. The machining system according to claim 1, wherein the display device is a screen, and the selection device is one or more keys and/or a computer mouse.

4. The machining system according to claim 1, wherein the display device and the selection device together form a touch screen.

5. The machining system according to claim 1, wherein the machined workpiece to be shown by the display device is shown using data of the original workpiece as well as of logical operations.

6. The machining system according to claim 1, comprising a conveying device configured to convey the workpieces through the machine tool.

7. A method of operating a machine tool configured to machine workpieces using the operating device of claim 1, the method comprising the following steps:
- selecting additive and removing machining operations on a machine tool, wherein the removing machining operations are milling operations and/or separating operations, and the additive machining operations are gluing operations of an edge band to a workpiece narrow surface of a substantially plate-shaped workpiece,
- displaying a model of a machined workpiece, wherein the displaying of the model of the machined workpiece is generated based on the previously selected machining operations,
- and machining the workpiece.

8. The method according to claim 7, wherein the method is performed using a machining system according to claim 1.

9. The method according to claim 7, comprising:
- manually or automatically selecting, or parametrically generating, a model of an unmachined workpiece prior to selecting the machining operations thereon.

10. The method according to claim 7, wherein
- the model of the machined workpiece is generated using a CAD model and/or a virtual volume model of an unmachined workpiece on which preferably logical operations are performed.

11. The method according to claim 7, further comprising: performing subsequent machining of the workpiece after the model is displayed.

* * * * *